(12) United States Patent
Gable et al.

(10) Patent No.: US 6,865,339 B1
(45) Date of Patent: Mar. 8, 2005

(54) DIGITAL VIDEO AND DATA RECORDER

(75) Inventors: Melvin Gable, Cowan Heights, CA (US); Roy Lewis, Westminister, CA (US); William Caldwell, Fountain Valley, CA (US)

(73) Assignee: Indigita Corporation, Santa Ana, CA (US)

( * ) Notice: Subject to any disclaimer, the term of this patent is extended or adjusted under 35 U.S.C. 154(b) by 913 days.

(21) Appl. No.: 09/665,326

(22) Filed: Sep. 19, 2000

Related U.S. Application Data

(62) Division of application No. 08/858,084, filed on May 16, 1997, now Pat. No. 6,151,443.

(51) Int. Cl.$^7$ .............................. H04N 7/26; H04N 7/04
(52) U.S. Cl. .......................... 386/109; 386/104; 386/96
(58) Field of Search ................................. 386/109, 111, 386/112, 27, 33, 46, 124, 125, 126, 123, 113, 114, 1, 37, 40, 21, 96, 52, 4, 104, 105, 106, 92, 99; 360/32; H04N 7/26, 7/04

(56) References Cited

U.S. PATENT DOCUMENTS

| | | | |
|---|---|---|---|
| 4,656,537 A | | 4/1987 | Toba et al. |
| 4,716,473 A | | 12/1987 | Kondo |
| 5,220,568 A | * | 6/1993 | Howe et al. ................. 714/782 |
| 5,220,736 A | | 6/1993 | Ando |
| 5,353,172 A | | 10/1994 | Alioth .......................... 360/70 |
| 5,377,051 A | | 12/1994 | Lane et al. |

(List continued on next page.)

FOREIGN PATENT DOCUMENTS

| EP | 0740298 A2 | 10/1996 |
|---|---|---|
| EP | 1 043 892 | 10/2000 |

OTHER PUBLICATIONS

Weiss, et al., "Switching Facilities in MPEG–2: Necessary But Not Sufficient", *SMPTE Journal*, vol. 104, No. 12, pp. 788–802, Dec. 1, 1995.

Hurst, et al., "MPEG Splicing: A New Standard for Television—SMPTE 312M", *SMPTE Journal*, vol. 107, No. 11, pp. 978–988, Nov., 1998.

*Primary Examiner*—Robert Chevalier
(74) *Attorney, Agent, or Firm*—Fish & Richardson P.C.

(57) ABSTRACT

A "pause and resume" function and a "channel change" function for recording and playing interframe compressed audiovideo data, particularly MPEG data. The invention includes a digital track format and a method for recording one or more sessions from one or more streams of interframe compressed audiovideo data which has been synchronized to a reference clock. The invention adds special "splice point" indicators to recorded video material. The splice point indicators are added either periodically (e.g., by recording a special reference clock) or when a discontinuity occurs in recording audiovideo data streams. Splice point indicators are used to determine the existence of a point of discontinuity in the recorded audiovideo data. The system and method enable pausing and later resuming recording of an audiovideo data stream such that the audiovideo data can be played back with proper resynchronization at each point of discontinuity (the "pause and resume" function). The format and method also allow for recording an abrupt change from one audiovideo data stream to a different audiovideo data stream having a different clock reference, such that the two recorded sequences are spliced together as one continuous recorded sequence that can be played back with resynchronization of the program audiovideo data at each splice point (the "channel change" function). As a consequence of using an added special reference clock as a splice point indicator, the invention also provides random access playback. In addition, the invention permits recording of conventional data in standard storage formats.

17 Claims, 3 Drawing Sheets

U.S. PATENT DOCUMENTS

| | | |
|---|---|---|
| 5,392,163 A | 2/1995 | Higuchi et al. |
| 5,673,358 A | 9/1997 | Boyce |
| 5,729,516 A | 3/1998 | Tozaki et al. |
| 5,758,010 A | 5/1998 | Ando |
| 5,892,633 A | 4/1999 | Ayres et al. |
| 5,917,988 A * | 6/1999 | Eto .............................. 386/52 |
| 5,974,225 A * | 10/1999 | Iwamoto et al. ............ 386/109 |
| 6,011,899 A | 1/2000 | Ohishi et al. |
| 6,067,303 A | 5/2000 | Aaker et al. |
| 6,151,443 A * | 11/2000 | Gable et al. ................. 386/109 |

* cited by examiner

DIGITAL VIDEO AND DATA RECORDER

REFERENCE TO RELATED APPLICATION

This application is a divisional of U.S. application Ser. No. 08/858,084, filed May 16, 1997 now U.S. Pat. No. 6,151,443.

BACKGROUND OF THE INVENTION

1. Field of the Invention

This invention relates to electronic recording and playback devices, and more particular to electronic recording and playback devices for recording and playing back compressed digital video and audio data.

2. Description of Related Art

A number of approaches exist for recording audiovideo sequences. Analog video tape solutions, such as VHS and Beta brand video cassette recorders, use a frame-to-frame recording process where each video frame is recorded on individual analog tracks at a fixed frame rate of 30 Hz for NTSC or 25 Hz for PAL. Each frame comprises two fields at 60 Hz for NTSC encoded video and two fields at 50 Hz for PAL encoded video. This analog method of recording allows for random access to each frame in the video sequence.

The Moving Picture Experts Group (MPEG) has promulgated widely accepted international standards for compression, decompression, and synchronization of digital video and audio signals. In particular, MPEG has defined a set of standards for video compression algorithms commonly used by broadcasters and studios for recording and broadcasting digital encoded video. The video and audio specifications give the syntax and semantics of encoded video and audio bitstreams necessary for communicating compressed digital video as well as for storing such video on media in a standard format.

The MPEG1 standard is officially described in ISO/IEC 11172 and the MPEG2 standard in ISO/IEC 13818.

More particularly, the MPEG standards define how elementary streams of encoded digital audio and video data are multiplexed and converted to an MPEG format, which may then be communicated on a channel in some channel-specific format for direct replay or for storage before channel transmission and replay. Within a channel is a Channel Stream, which could be a System Stream in MPEG1, and either a Program Stream or Transport Stream in MPEG2.

A processed Channel Stream is demultiplexed, and the elementary streams produced are input into Video and Audio Decoders, the outputs of which are decoded video and audio signals. FIG. 1 is a block diagram of a prior art MPEG decoder, showing the application of a Channel Stream of MPEG encoded data to a channel specific decoder 1 which decodes the channel-specific transmission format. The output of the channel specific decoder 1 is coupled to a system decoder 2, which demultiplexes the digital audio and video data. Video data is further applied to a video decoder 3, and audio data is further applied to an audio decoder 4. There is a flow of timing information among the several decoders, controlled by a clock controller 5. All elementary data streams are decoded and presented with time synchronization.

The MPEG2 standard specifically defines three types of video pictures or frames: intra-coded, predicted, and bi-directional. Intra-coded or I-frames are coded using only information present in an image frame itself. I-frames provide random access points into a compressed video data stream. I-frames use only transform coding (discrete cosine transform, or "DCT"), and therefore provide moderate compression. Predicted or P-frames are coded based in part on information within the nearest previous I or P frame, using a technique called forward prediction. P-frames provide more compression than I-frames and serve as a reference for bi-directional or B-frames and for later P-frames. P-frames can propagate coding errors since P-frames are generally predicted from previous P-frames. B-frames are frames that use both past and future frames as a reference. Bi-directional frames provide the most compression of the three frame types and do not propagate errors because they are never used as a reference. The MPEG2 algorithm allows the encoder to choose the frequency and location of I-frames, and thus MPEG recordings have a non-fixed frame rate. This characteristic makes it difficult to have random accessibility to a scene cut in a video sequence which is between I-frames. To achieve random access, a video sequence must start at an I-frame.

It would be desirable to be able to record and playback encoded video and audio that is digitally encoded at a non-fixed frame rate. However, two problems exist when attempting to perform such recording: a "channel changing" problem arising from attempts to record video sequences from two or more independent MPEG data streams, and a "pause and resume" problem arising from attempts to record a single MPEG video sequence while occasionally pausing such recording.

The MPEG standards provide a timing mechanism that ensures synchronization of audio and video. The MPEG1 standard defines two parameters used by an MPEG decoder: a system clock reference (SCR) and a presentation time stamp (PTS). The MPEG2 standard adds a program clock reference (PCR) that is equivalent to the SCR. Both the SCR and PCR have extensions in order to achieve a resolution of 27 MHz (the term "SCR/PCR" will be used herein to denote either clock reference). The SCR/PCR is a snapshot of the encoder system clock. The SCR/PCRs used by an MPEG video decoder 3 and audio decoder 4 must have approximately the same value for proper synchronization. The video decoder 3 and audio decoder 4 update their internal clocks using the SCR/PCR value sent by the system decoder 2. Each decoded video picture and decoded audio time sequence (both are also referred to as "presentation units") has a PTS associated with it. The PTS represents the time at which the video picture is to be displayed or the starting playback time for the audio time sequence.

If video sequences from two or more independent streams are spliced together, the SCR/PCR values will be different for each of the streams. Hence, the PTS for the video and audio will become unlocked from the original SCR/PCR clock. Conventionally, the video decoder 3 and audio decoder 4 will either discard the affected presentation units if their PTS is earlier (has a smaller value) than the current SCR/PCR, or repeat the affected presentation units if their PTS is later (has a larger value) than the current SCR/PCR. In either case, the output is visually and audibly affected by the clock mismatch.

When pausing during the recording of an MPEG video sequence, mixing of streams having B-frames or P-frames will result in improper decoding. Streams from the different recording sessions must be separated to avoid generation of predicted picture frames using inappropriate picture references (i.e., I or P frames from a different video sequence). This problem also occurs when splicing two independent sequences.

Digital Video (DV) is a relatively new video compression format standard. DV does not contain the bi-directional and predictive frames of MPEG2. Therefore, session boundaries can be at any frame. DV produces a fixed data rate of approximately 25 Mbps utilizing a fixed 5:1 compression based on 4:1:1 YUV video sampling. DV compression relies on discrete cosine transforms like MPEG, but adds the enhancement of field interpolation on low-motion scenes. When recording digital video data, such information is interleaved across the recording medium (e.g., tape) within a single frame. This technique is used to reduce dropouts and other tape artifacts commonly found in analog track formats. Although DV provides random access, it does not have the ability to record more highly compressed MPEG data streams, which include P-frames or B-frames.

Accordingly, the inventors have determined that it would be desirable to be able to intermittently record and pause MPEG video sequences, to splice independent sequences, and to provide random access to recorded video sequences without the problems of current technology. The present invention provides a method and apparatus for accomplishing this goal.

SUMMARY OF THE INVENTION

The invention generally relates to the recording of digital video and audio data, and more particularly to implementation of a "pause and resume" function and a "channel change" function for recording and playing interframe compressed audiovideo data, particularly MPEG data. The invention includes a digital track format and a method for recording one or more sessions from one or more streams of interframe compressed audiovideo data which has been synchronized to a reference clock. The invention adds special "splice point" indicators to recorded video material. The splice point indicators are added either periodically (e.g., by recording a special reference clock) or when a discontinuity occurs in recording audiovideo data streams. Splice point indicators are used to determine the existence of a point of discontinuity in the recorded audiovideo data.

The system and method enable pausing and later resuming recording of an audiovideo data stream such that the audiovideo data can be played back with proper resynchronization at each point of discontinuity (a "pause and resume" function). The format and method also allow for recording an abrupt change from one audiovideo data stream to a different audiovideo data stream having a different clock reference, such that the two recorded sequences are spliced together as one continuous recorded sequence that can be played back with resynchronization of the program audiovideo data at each splice point (a "channel change" function).

As a consequence of using an added special reference clock as a splice point indicator, the invention also provides random access playback. In addition, the invention permits recording of conventional data in standard storage formats.

The details of the preferred embodiment of the invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the invention.

Overview

To record MPEG-encoded interframe compressed audiovideo data in real-time without re-encoding the underlying original audiovideo data requires that some provision be made for handling the recording of "splice points". A splice point is defined as a point within recorded multiplexed interframe compressed audiovideo data where the system clock reference changes due to a change in the program material (such as changing channels within a broadcast receiver) or where presentation time stamps differ between reference frames because an input data stream was paused and later resumed. A "session" is recorded audiovideo data ending in a splice point (or an end-of-file, end-of-tape, or similar signal). Recording one input stream of data may result in a plurality of sessions due to pausing and resuming recording; recording two or more input streams of data will result in a plurality of sessions.

Figure 2:
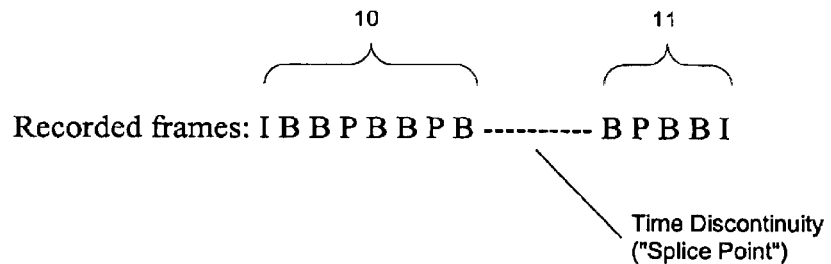
FIG. 2 is a timing diagram showing a splice point between two independent MEG sequences.

FIG. 2 is a timing diagram showing a splice point between two independent MPEG data streams 10, 11. To prevent malfunction after a splice point, the audio and video decoders must be informed of changes in the system clock reference and presentation time stamps. The video decoder must also have a method of finding a reference picture for resynchronization after a splice point is detected in the recorded data stream. The invention accomplishes these functions by adding special "splice point" indicators to recorded video material. The splice point indicators are added either periodically (e.g., by recording a special reference clock) or when a discontinuity occurs in recording audiovideo data streams. Splice point indicators are used to determine the existence of a point of discontinuity in the recorded audiovideo data.

Recording Process—Time Stamp Embodiment

Because the level of compression varies in MPEG encoded video material, there is no direct relationship between a data stream and video frames. Accordingly, to obtain a reference for the video frames, one embodiment of the invention adds a special time-stamp to the data stream when recording an MPEG-encoded data stream onto media such as tape or disk. For recording purposes, a record/playback drive would be coupled through the system to an MPEG data stream before the MPEG system decoder 2 shown in FIG. 1. During recording, the remainder of the decoding system 2-5 can remain operational if desired.

More particularly, an otherwise conventional recording record/playback drive (e.g., a DDS or DDS2 4 mm DAT tape drive or recordable CDROM drive) is modified to embody an internal clock reference, preferably operating at about 27 MHz, and a time-stamp clock reference, preferably operating at about 90 KHz. The internal clock reference is loaded with the system clock reference (SCR/PCR) value, received from MPEG encoded video material when a receiving decoder (internal to the record/playback drive) has locked to the encoded system clock. This allows the record/playback drive to maintain synchronization with the system clock reference used in encoding the MPEG stream. The time-stamp clock reference provides a time-stamp for recorded data.

MPEG-encoded video is encoded in blocks which are recorded on tracks. In the invention, when recording an MPEG-encoded data stream, each recorded data block contains a subcode group in which the running value of the internal clock reference is stored. The preferred track and block format is described below. In addition, a current value for the time-stamp clock reference is inserted into a "continuity" time-stamp field as a data reference for random access to the tape content. In the preferred embodiment, continuity time-stamp references are written at the track rate for a helical-scan tape recorder, which in one embodiment is every $\frac{1}{200}^{th}$ of a second. In the preferred embodiment, this rate equals about once per block, but need not occur in every block. In general, the rate for recording continuity time-stamp references should be sufficiently high (at least about once per second) so as to substantially eliminate perceptible visual defects during recovery from splice point occurrences, as described below.

Using this time stamp approach, during a pause in a program recording session, the internal clock reference and the time-stamp clock reference continue incrementing in the record/playback drive, but are not recorded on the medium. Thus, the track continuity time-stamp references will not be recorded at the pre-defined rate. Accordingly, detecting such "time defects" in the recorded time-stamp references allows for easy identification of a splice point in the recorded data stream.

If the program stream is changed to a different encoded program source, then the receiving channel-specific decoder must again lock to the encoder's reference clock. The record/playback drive must then be reloaded with the SCR/PCR value in the encoded video material to reestablish the internal clock reference and reset the time-stamp clock reference. Different encoded MPEG streams will contain different SCR/PCR values.

Hence, when a splice point is encountered on the recording medium, there will be an identifiable time discontinuity that can be detected.

Figure 3:
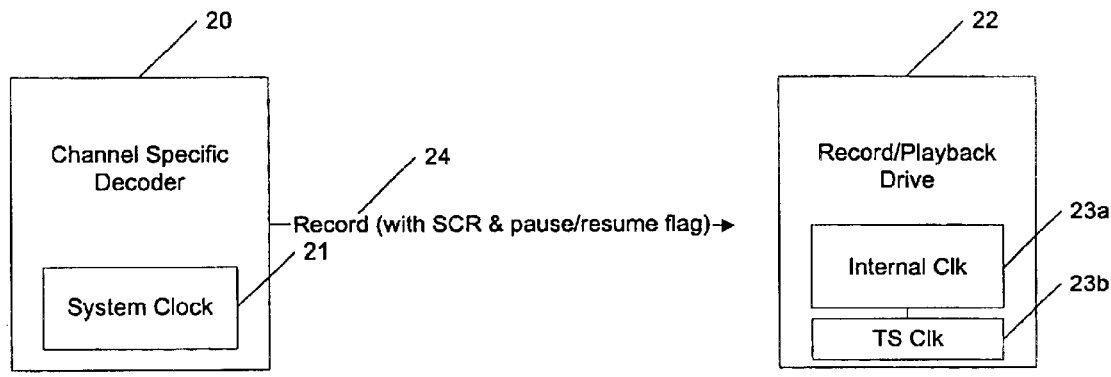
FIG. 3 is a block diagram of a record sequence for a channel specific decoder and a record/playback drive in accordance with the invention.

FIG. 3 is a block diagram of a recording sequence for a channel specific decoder and a record/playback drive in accordance with the invention. A channel specific decoder 20 (comparable to channel specific system decoder 1 in FIG. 1) having an internal system clock 21 is coupled by a bus or other connection (not shown) to a record/playback drive 22 which has an internal reference clock 23a. A time-stamp clock 23b is derived from the system clock 23a. In the preferred time-stamp embodiment, the system clock 23a generates continuity time-stamps each comprising a 33-bit number that records each tick of a 90-KHz clock.

During recording, a Record command 24 is transmitted from the channel specific decoder 20 to the record/playback drive 22. The Record command 24 is configured to transmit the SCR/PCR for the current decoded program material, which is used to synchronize the internal reference clock 23a. Normally, once set, the internal reference clock 23a stays synchronized with the current program source. In the preferred embodiment, the Record command 24 also contains a pause/resume flag (e.g., a single toggle bit or a command word) that indicates whether the record/playback drive 22 should physically record onto the medium or otherwise continue to track the system clock 21 without recording.

Recording Process—Event-Driven Splice Point Indicator

In an alternative embodiment, if a splice point occurs due to a pause in recording or a channel change, an "event-driven" splice point indicator can be recorded by the record/playback drive 22 onto the recording medium. The triggering event for recording a splice point indicator due to a pause can be receipt of a Record command 24 with the pause flag set. For a channel change event, the trigger for recording a splice point indicator can be any desired signal characteristic.

In this embodiment, the splice point indicator can simply be a flag (e.g., a single toggle bit or a command word) recorded in some or all of the blocks of audiovideo data on the medium.

Playback Process

Figure 1:
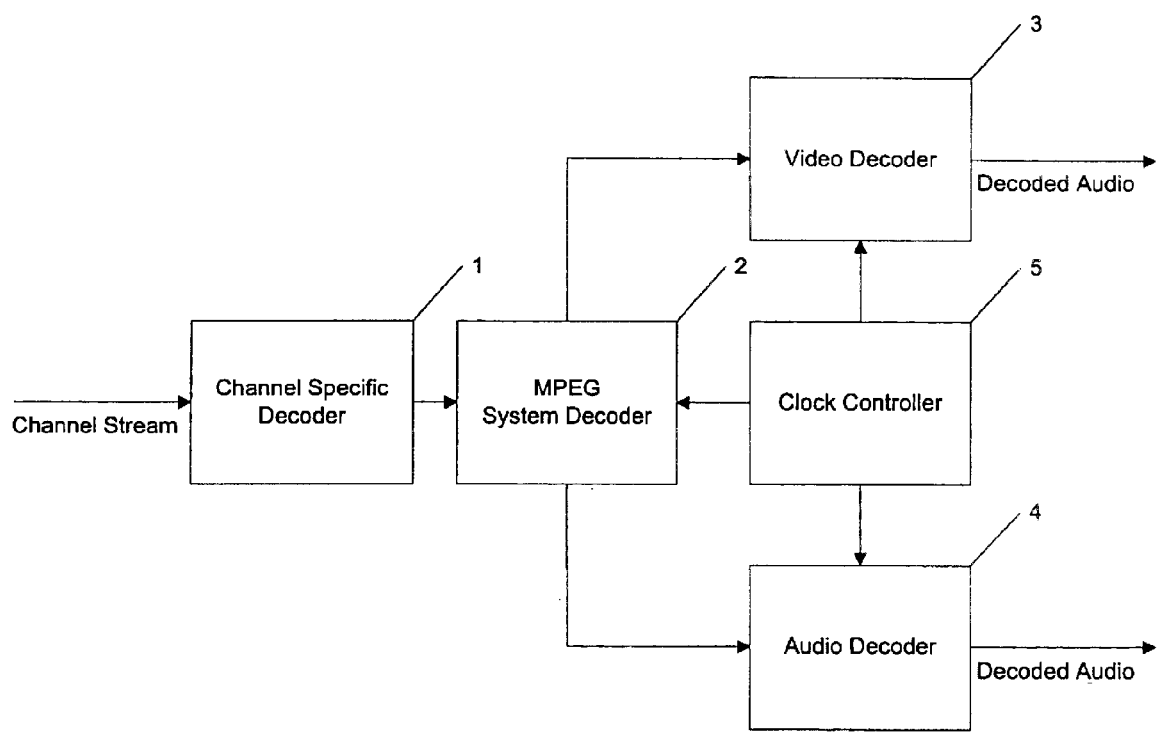
FIG. 1 is a block diagram of a prior art MPEG decoder.

For playback purposes, the output of the record/playback drive 22 would be coupled through the system to the MPEG system decoder 2 shown in FIG. 1. During playback, recorded data tracks are monitored for indications of a splice point. When using an event-driven splice point indicator, simply detecting the indicator is sufficient. When using continuity time-stamp references, non-sequential values in the continuity time-stamp field indicate a splice point. That is, time discontinuities are detected when the continuity time-stamp references are not encountered at the pre-defined output rate of the time-stamp clock 23b, as would occur across a splice point. In the preferred embodiment, since each continuity time-stamp comprises a 33-bit number that records each tick of a 90-KHz clock, simply subtracting each continuity time-stamp from the next occurring time-stamp and comparing the result to an expected pre-defined value (such as the track rate) will indicate whether a splice point has occurred.

Based on detection of a splice point, the record/playback drive 22 notifies the channel specific decoder 1 to re-synchronize the audio and video streams in the decoders. Further, when using continuity time-stamp references, the invention also provides random access playback, since access to recorded data in the "middle" of a sequence is equivalent to encountering a splice point. That is, a user can move the tape to a desired location and start playback; the record/playback drive 22 will detect a difference in the continuity time-stamp reference from a prior saved state. The record/playback drive 22 will treat such a difference as if a splice point indicator had been encountered, and notifies the channel specific decoder 1 to re-synchronize the entire decoding system. Since the continuity time-stamp references occur relatively frequently, this embodiment of the invention provides the desired random access with little time delay before resynchronization.

Figure 4:
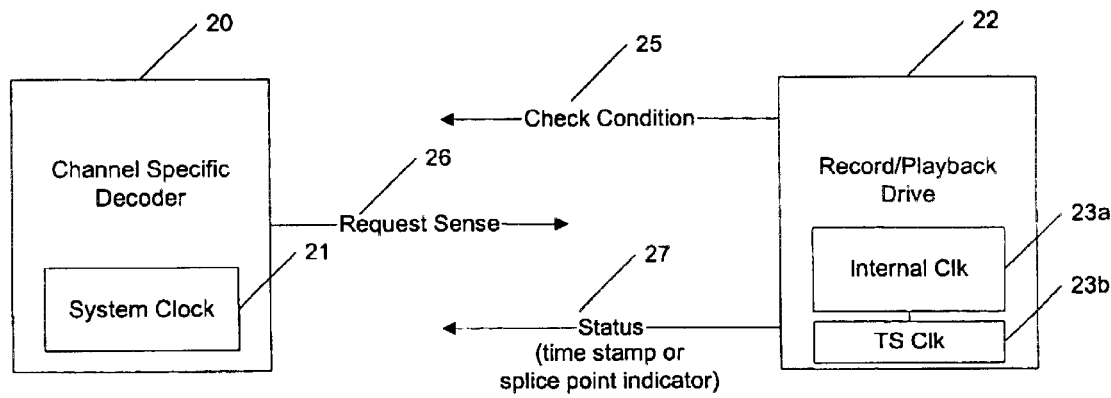
FIG. 4 is a block diagram of a playback sequence for a channel specific decoder and a record/playback drive in accordance with the invention.

FIG. 4 is a block diagram of a playback sequence for a channel specific decoder 20 and a record/playback drive 22 in accordance with the invention. When the record/playback drive 22 detects a splice point indicator in the video stream, the record/playback drive 22 outputs a "Check Condition" signal 25 to the channel specific decoder 20. The channel specific decoder 20 then responds with a conventional "Request Sense" command 26 to determine the status of the record/playback drive 22. The record/playback drive 22 returns a "Status" packet 27 to indicate a splice point. The Status packet 27 may simply be a flag indicating that a splice point indicator has been encountered, or may include specific information which may be used to determine if the splice point was caused by either a pause condition or a program channel change. For example, the Status packet 27 may include a time stamp value for the session following the splice point indicator, or a Program Identification ("PID") value. The PID is a standard field in all MPEG audiovideo data transport streams that uniquely identifies each data block as belonging to a particular program.

After receipt of the Status packet 27, the channel specific decoder 20 determines if the splice point was caused by either a pause condition or a program channel change. For example, if the current PID value (read from the program stream or from the status packet 27) is the same as the PID value from previously decoded material (the channel specific decoder 20 stores such information from each decoded block), then the splice point indicator was due to a pause condition—the same program was recorded in the sessions before and after the splice point indicator.

In this case, the channel specific decoder 20 can simply adjust the system clock 21 to the SCR/PCR value of the current data blocks or to a time stamp reference provided from the record/playback drive 22. This capability gives the record/playback drive 22 the ability to reset all the parameters in the audio and video decoders and continue playing the new stream (i.e., the next session of audiovideo data after the splice point) with minimal time lapse for the changeover from the prior session.

If the current PID value is different from the previous program material, then the splice point indicator was due to a channel change—different programs were recorded in the sessions before and after the splice point indicator. In this case, a more complex procedure is followed in the preferred embodiment:

1) The channel specific decoder 20 needs to determine a new elementary stream ID used in the new program material. An elementary stream ID identifies a particular video or audio stream. The channel specific decoder 20 starts parsing the transport stream of audiovideo data from the record/playback drive 22 for blocks having a new elementary stream ID. The data buffers for the audio and video decoders are flushed. When the new program channel is decoded, the data packets are demultiplexed and passed to the audio and video decoders. The system clock 21 is reset to the value of the PCR value decoded from the new PID transport stream. Alternatively, when using continuity time-stamp references, the time-stamp value for the beginning of the next session can be pre-set to a value from which an appropriate reset value can be derived, and that reset value can be used to reset the system clock 21.

2) The audio and video decoders are reset with new presentation time stamp values determined from the current elementary streams to be decoded, and continue decoding MPEG information in the data packets from the program channel.

3) At this point the audio and video decoders should be synchronized with the new system clock 21 and begin decoding the new data from the transport program stream. The video decoder looks for a new I-frame to begin video motion, and the audio decoder looks for the next audio block. Once the new reference I-frame is found, the following video data stream can be decoded and viewed. This search process will result in B and P frames being discarded until the new reference I-frame is detected, resulting in a slight delay between the pre-splice point session and the post-splice point session. However, since the playback data is typically buffered in memory, this search process is generally fast enough to minimize or eliminate any visual defects in the displayed video image.

The ability for the record/playback drive 22 to handle both a program pause or a program channel change with the "Check Condition", "Request Sense", "Status" handshake simplifies the re-synchronization process for the channel specific decoder 20.

Other means may be used for determining if the splice point was caused by either a pause condition or a program channel change. For example, various time-stamp fields in the MPEG data stream can be read and compared, or the time-stamp value from a continuity time-stamp field may be used.

Figure 5:
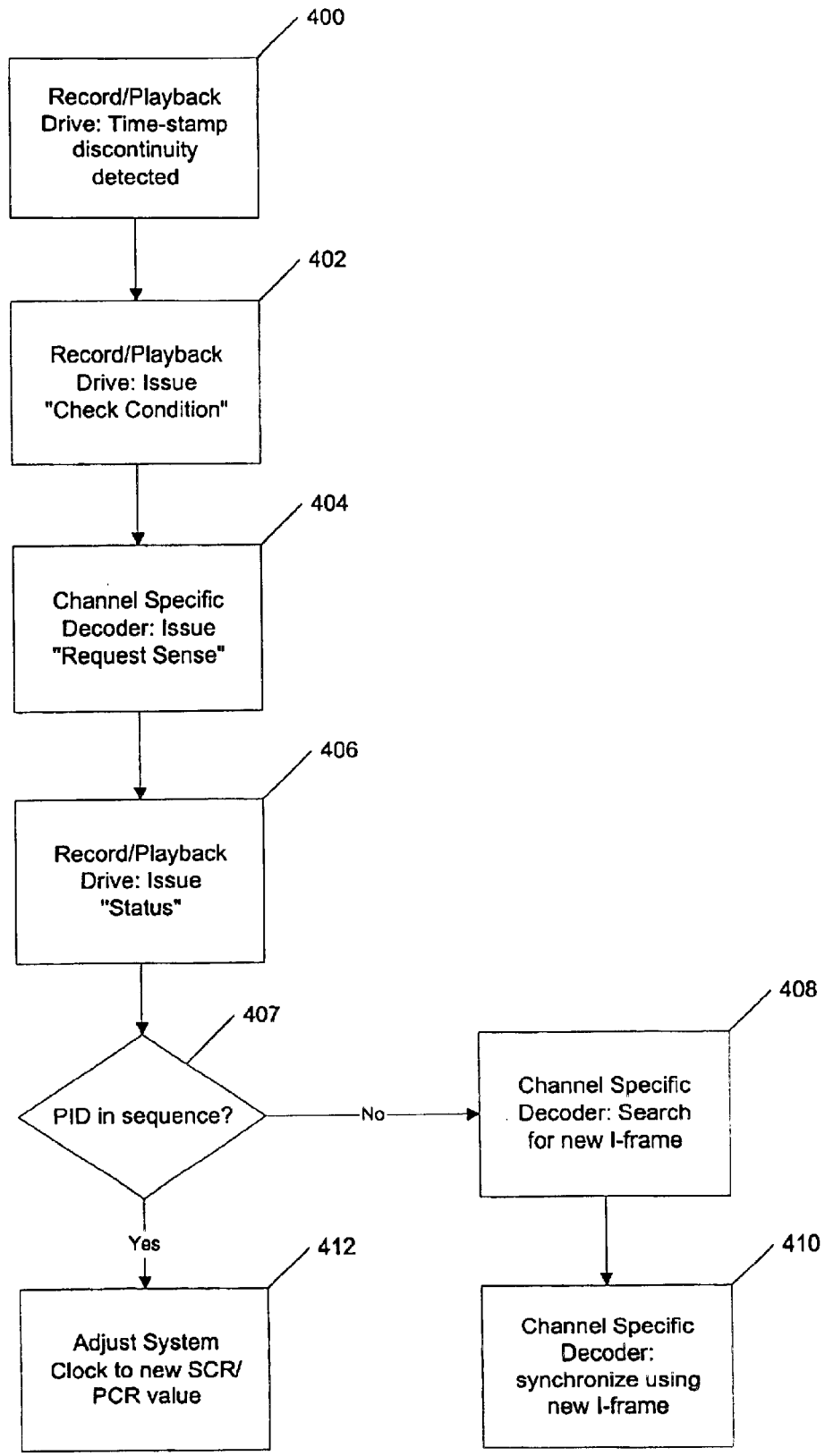
FIG. 5 is a flowchart showing the resynchronization process of the preferred embodiment of the invention.

FIG. 5 is a flowchart showing the resynchronization process of the preferred embodiment of the invention, using a continuity time-stamp field as a splice point indicator and PID's for pause/channel change determination. When a discontinuity in the continuity time-stamp field is detected (STEP 400), the record/playback drive 22 issues a "Check Condition" signal 25 to the channel specific decoder 20 (STEP 402). The channel specific decoder 20 issues a "Request Sense" command 26 (STEP 404). The record/playback drive 22 issues a Status packet 27 (STEP 406). The channel specific decoder 20 then determines if an associated next PID value is the same as or different from a prior saved PD) value (STEP 407). If not, the channel specific decoder 20 searches for the next I-frame (STEP 408), and resynchronizes the decoding process using the new I-frame (STEP 410); if so, the channel specific decoder 20 adjusts the system clock 20 to a new SCR/PCR value, as described above (STEP 412).

A similar method is used when the splice point indicator is simply a flag field. Detection of a splice point indicator can be done by any of several circuits or programmed electronics systems. It should be noted that the preferred embodiment does not record splice point indicators (such as the continuity time-stamp values) at precise physical locations on a medium, such that gating circuitry simply detects the presence or absence of a splice point indicator. Rather, the splice point indicator fields preferably are coded within data blocks and conventional block and field parsing techniques and circuitry are used to detect each field as part of the recorded data.

Track and Block Formats

Following is a description of the preferred track format for implementing one embodiment of the invention. A particularly useful aspect of this track format is that it permits recording of conventional data in standard storage formats, such as the well-known DDS and DDS2 data storage formats, and the digital audio tape (DAT) formats. Thus, a record/playback drive implementing the invention with the preferred tape track format provides dual or triple modes: MPEG recording and data and/or audio recording. In the information below, "DVDS" stands for "Digital Video Data Storage", and is a trademark of one implementation of the invention.

Basic Track and Block Parameters:

| | |
|---|---|
| Track | = 53 Sync Blocks (132 bytes with 4 byte header) |
| | = 212 Blocks (8 Blocks Preamble) |
| Sync Block | = 1320 Channel Bits (4 byte header + 128 bytes data) |
| Modulation | = 8/10 Encoding |
| Main Data | = 48 Sync Blocks |
| | = 198 Blocks |
| Subcode = | = 1 Sync Block (for high-speed searching) |
| Spacer = | = 1 Sync Block (for high-speed searching) |
| Preamble = | = 2 Sync Blocks (includes margin for track edge) |
| Postamble = | = 1 Sync Block |

-continued

Physical Track Layout:

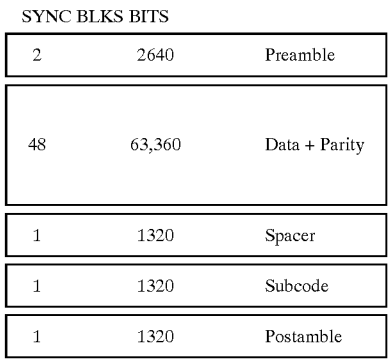

Coding Patterns:

Preamble = 111 pattern
Data + Parity = C1 and C2 codewords
Postamble = 111 pattern Sync Block Format:

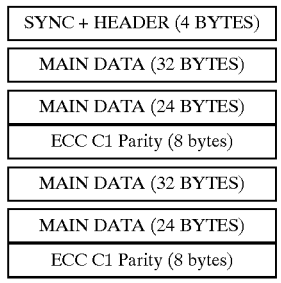

Sync Block Header Format:

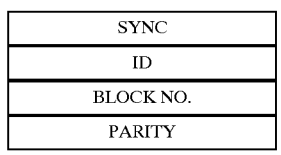

Sync = 0100010001 for Q = −1
= 1100010001 for Q = +1
Format ID = 00 DAT Audio Format
= 01 for DDS Format
= 10 for DVDS Format
Block = Block Number in Track
Parity = ID XOR Block No.

Subcode Byte Format:

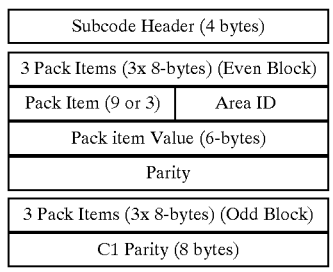

-continued

Repeat Even and Odd Blocks for redundancy.

Area ID = 0000 Device Area
= x001 Reference Area
= x010 System Area
= x100 Data Area
= x101 EOD Area Note:
x is set to 1 in a Single Data Space. For two partitions, x = 0 for partition 1, x = 1 for partition 0.

The Subcode+Header field is covered by C1 and C2 ECC. Subcode Pack Items 1–8 conform to DDS-2 Specification. Pack Item 9 is used to store the 33-bit continuity time-stamp (as 5 bytes in the Pack Item Value field) in the Data Area of the recording medium.

Thus, the invention enables pausing and later resuming recording of an audiovideo data stream such that the audiovideo data can be played back with proper resynchronization at each point of discontinuity (a "pause and resume" function). The format and method also allow for recording an abrupt change from one audiovideo data stream to a different audiovideo data stream having a different clock reference, such that the two recorded sequences are spliced together as one continuous recorded sequence that can be played back with resynchronization of the program audiovideo data at each splice point (a "channel change" function). As a consequence of using an added special reference clock as a splice point indicator, the invention also provides random access playback. In addition, the invention permits recording of conventional data in standard storage formats.

A number of embodiments of the invention have been described. Nevertheless, it will be understood that various modifications may be made without departing from the spirit and scope of the invention. For example, while the preferred medium for recording digitally encoded audiovideo data is tape, the invention can be readily adapted for recording such data onto magnetic disks and diskettes, optical recording media, and solid-state recording media. Accordingly, it is to be understood that the invention is not to be limited by the specific illustrated embodiment, but only by the scope of the appended claims.

What is claimed is:

1. A method of recording, with a channel change function, and playing back, sessions from multiple digitally encoded, interframe compressed streams of audiovideo data, comprising the steps of:
    (a) formatting each digitally encoded, interframe compressed stream of audiovideo data for recording;
    (b) recording each formatted stream on a recording medium as one or more sessions while permitting changes between different formatted streams, wherein the end of each session defines a channel change between different formatted streams;
    (c) recording on the recording medium one or more splice point indicators providing information sufficient to determine the end of each session;
    (d) reading each session from the recording medium;
    (e) applying each session to a synchronizable decoding device;
    (f) detecting one or more splice point indicators;
    (g) determining the end of a session based on the information provided by the detected splice point indicators; and (h) re-synchronizing the decoding device to a reference clock value corresponding to a next session in response to detection of each session end.

2. The method of claim 1, wherein each splice point indicator delineates the end of a session.

3. The method of claim 1, wherein the splice point indicators are continuity time-stamp fields periodically recorded on the recording medium.

4. The method of claim 3, wherein the reference clock value is derived from at least one continuity time-stamp field.

5. The method of claim 3, wherein the period of the continuity time-stamp fields permits re-synchronization with essentially no perceptible interruption in decoding of the streams.

6. The method of claim 5, wherein the period of the continuity time-stamp fields is at least equal to the track rate of a helical scan recording device.

7. The method of claim 1, wherein the reference clock value is embedded in such next session.

8. The method of claim 1, wherein the digitally encoded, interframe compressed streams of audiovideo data are MPEG-encoded.

9. The method of claim 1, wherein the step of re-synchronizing comprises the steps of:

(a) issuing a check condition indicating detection of the end of a session;

(b) receiving a request sense command; and (c) determining a reference clock value in response to receipt of the request sense command.

10. A system for recording, with a channel change function, and playing back, sessions from multiple digitally encoded, interframe compressed streams of audiovideo data, comprising:

(a) a formatting system for formatting each digitally encoded, interframe compressed stream of audiovideo data for recording;

(b) a recording device for recording each formatted stream on a recording medium as one or more sessions while permitting changes between different formatted streams, wherein the end of each session defines a channel change between different formatted streams, and for recording on the recording medium one or more splice point indicators providing information sufficient to determine the end of each session;

(c) a media reading device for reading each session from the recording medium and applying each session to a synchronizable decoding device;

(d) a detector for detecting one or more splice point indicators and determining the end of a session based on the information provided by the detected splice point indicators; and (e) a control system for re-synchronizing the decoding device to a reference clock value corresponding to a next session in response to detection of each session end.

11. The system of claim 10, wherein each splice point indicator delineates the end of a session.

12. The system of claim 10, wherein the splice point indicators are continuity time-stamp fields periodically recorded on the recording medium.

13. The system of claim 12, wherein the reference clock value is derived from at least one continuity time-stamp field.

14. The system of claim 12, wherein the period of the continuity time-stamp fields permits re-synchronization with essentially no perceptible interruption in decoding of the streams.

15. The system of claim 14, wherein the period of the continuity time-stamp fields is at least equal to the track rate of a helical scan recording device.

16. The system of claim 10, wherein the reference clock value is embedded in such next session.

17. The system of claim 10, wherein the digitally encoded, interframe compressed streams of audiovideo data are MPEG-encoded.

* * * * *